United States Patent
Donovan (10) Patent No.: US 7,475,863 B2
(45) Date of Patent: Jan. 13, 2009

(54) PISTON FOR REVERSE FLOW DIAPHRAGM VALVE

(75) Inventor: Ryan Donovan, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 383 days.

(21) Appl. No.: 11/251,023

(22) Filed: Oct. 14, 2005

(65) Prior Publication Data

US 2007/0085047 A1      Apr. 19, 2007

(51) Int. Cl.
F16K 31/12 (2006.01)
F16K 51/00 (2006.01)
F16K 35/00 (2006.01)

(52) U.S. Cl. .................. 251/30.02; 251/285; 251/95

(58) Field of Classification Search ............ 251/30.02, 251/284, 285, 331, 100, 95, 82, 42, 96
See application file for complete search history.

(56) References Cited

U.S. PATENT DOCUMENTS

| | | | |
|---|---|---|---|
| 2,870,986 A | | 1/1959 | Vargo |
| 3,103,338 A | | 9/1963 | Marmo |
| 3,155,366 A | | 11/1964 | Rasmussen |
| 3,240,128 A | | 3/1966 | Wilson |
| 3,362,679 A | | 1/1968 | Le Wan |
| 3,700,206 A | * | 10/1972 | Jones ................ 251/84 |
| 4,226,259 A | * | 10/1980 | Szekely et al. ........ 137/269 |
| 4,477,051 A | * | 10/1984 | Ben-Yehuda ......... 251/30.01 |
| 4,624,442 A | | 11/1986 | Duffy et al. |
| 4,671,485 A | * | 6/1987 | Saarem .............. 251/30.03 |
| 4,700,735 A | * | 10/1987 | Hamernik et al. ...... 137/270 |
| 4,715,578 A | | 12/1987 | Seltzer |
| 5,213,124 A | * | 5/1993 | Costa ................ 137/1 |
| 5,213,303 A | | 5/1993 | Walker |
| 5,217,043 A | | 6/1993 | Novakovi |
| 5,238,024 A | * | 8/1993 | Taylor ................ 137/613 |
| 5,850,853 A | | 12/1998 | Ohmi et al. |
| 5,979,482 A | * | 11/1999 | Scott ................. 137/15.01 |
| 5,996,608 A | * | 12/1999 | Hunter et al. ......... 137/244 |
| 6,079,437 A | * | 6/2000 | Beutler et al. ........ 137/181 |
| 6,202,683 B1 | * | 3/2001 | Smith ................ 137/498 |
| 6,290,203 B1 | | 9/2001 | Kolze |
| 6,296,227 B1 | | 10/2001 | Burcham et al. |
| 6,374,855 B1 | * | 4/2002 | Hansen ............... 137/510 |
| 6,415,818 B2 | | 7/2002 | Dickman et al. |
| 6,749,136 B1 | * | 6/2004 | Wilson et al. ......... 239/569 |
| 6,752,376 B1 | | 6/2004 | Satou et al. |
| 6,786,470 B2 | | 9/2004 | Newberg |
| 2001/0032946 A1 | | 10/2001 | Dickman et al. |
| 2002/0145123 A1 | | 10/2002 | Kah, Jr. et al. |
| 2005/0017212 A1 | | 1/2005 | Newberg |

* cited by examiner

Primary Examiner—Gregory L Huson
Assistant Examiner—Andrew J Rost
(74) Attorney, Agent, or Firm—Fitch, Even, Tabin & Flannery (57) ABSTRACT

An improved, reverse-flow diaphragm valve assembly having a valve member encased within a valve housing including a base portion, having inlet and outlet ports, and a bonnet. The valve member is carried by a resilient diaphragm in a pressure chamber. In a preferred form, a solenoid actuated valve can command the movement of the valve member between closed position and open positions. A hand settable control piston and spring manage forces on the diaphragm, allowing the user to set the pressure drop across the valve. The control piston has an enlarged portion, preferably a flared flange, for providing support for the resilient diaphragm to help prevent wear and damage so to prolong the life of the diaphragm.

15 Claims, 7 Drawing Sheets

PISTON FOR REVERSE FLOW DIAPHRAGM VALVE

FIELD OF THE INVENTION

The present invention generally relates to diaphragm valves and, more particularly, to a piston for a reverse flow diaphragm valve.

BACKGROUND OF THE INVENTION

Irrigation systems are used to provide water to a wide variety of devices, including, for example, spray nozzles, sprinkler heads, and drip hoses. Such systems generally make use of control valves to command the flow of water under pressure through the system. The control valve generally comprises a valve housing having an inlet for connection to a source of water under pressure, and an outlet for connection via suitable conduits to associated watering devices. A valve member is mounted within the valve housing for movement between open and closed positions relative to a valve seat for controlled coupling of the water supply to the watering devices. In one common form, the water supply valve may include a remotely operated solenoid actuator for displacing the valve member between the open and closed positions. In addition, the supply valve regulates the flow rate such as with a pressure responsive resilient diaphragm for movably positioning the valve member in a manner to maintain a substantially constant flow rate so long as the pressure of the supply water is above a predetermined threshold.

In common water supply valves, the valve housing is constructed from two or more housing components formed from cast metal or molded plastic, and assembled with the associated valve member and resilient diaphragm movably mounted therein. In a jar top valve, the two main housing components are a base, comprising an inlet and an outlet, and a bonnet which is threaded onto the base and which defines, with the base, a pressure chamber.

In a reverse flow diaphragm valve, fluid enters the housing through an inlet and flows into a pressure chamber. A valve member is carried by a resilient diaphragm and is located within the pressure chamber and divides the pressure chamber into an inlet chamber and a control chamber. An annular valve seat is located at the downstream end of the inlet chamber. The valve member can be in a closed position, sealing against the valve seat and shutting off flow through the valve, or in a range of open positions, permitting and possibly regulating flow through the valve to an outlet.

The valve may be closed manually by driving the valve member against the valve seat using a control piston and spring. Alternatively, a solenoid actuator can be used to control the opening and closing of the valve by manipulating the hydraulic forces acting on the diaphragm. When the solenoid actuator is in its open position, it vents the control chamber through a feed port to relieve pressure therein. Hydraulic forces on the diaphragm come into equilibrium and the diaphragm allows movement of the valve member from the closed position to a range of open positions permitting controlled flow through the valve. When the solenoid actuator is in its closed position, the feed port is sealed and fluid pressure builds up in the control chamber, acting to urge the diaphragm and valve member to the closed position prohibiting flow through the valve assembly.

Flow through the valve is controlled by the position of a control piston which can be manipulated by hand via a flow control handle. The position of the control piston determines position of a spring used to apply a biasing force to the valve member. As the control piston is lowered, the biasing force of the spring increases and the valve member is urged closer to the valve seat, leading to a greater pressure drop across the valve and reducing the flow rate through the valve. The pressure drop across the valve is reflected in a corresponding pressure differential between the inlet chamber and the control chamber. Under low flow conditions, this pressure differential across diaphragm, and the displacement of the diaphragm, are greatest. This can create stresses on resilient diaphragm member and can lead to tearing and generally reduced life of the diaphragm material. Accordingly, there is a need for an improved diaphragm valve that can protect the resilient diaphragm from undue stresses and prolong its life.

DETAILED DESCRIPTION OF THE PREFERRED EMBODIMENT(S)

Figure 1:
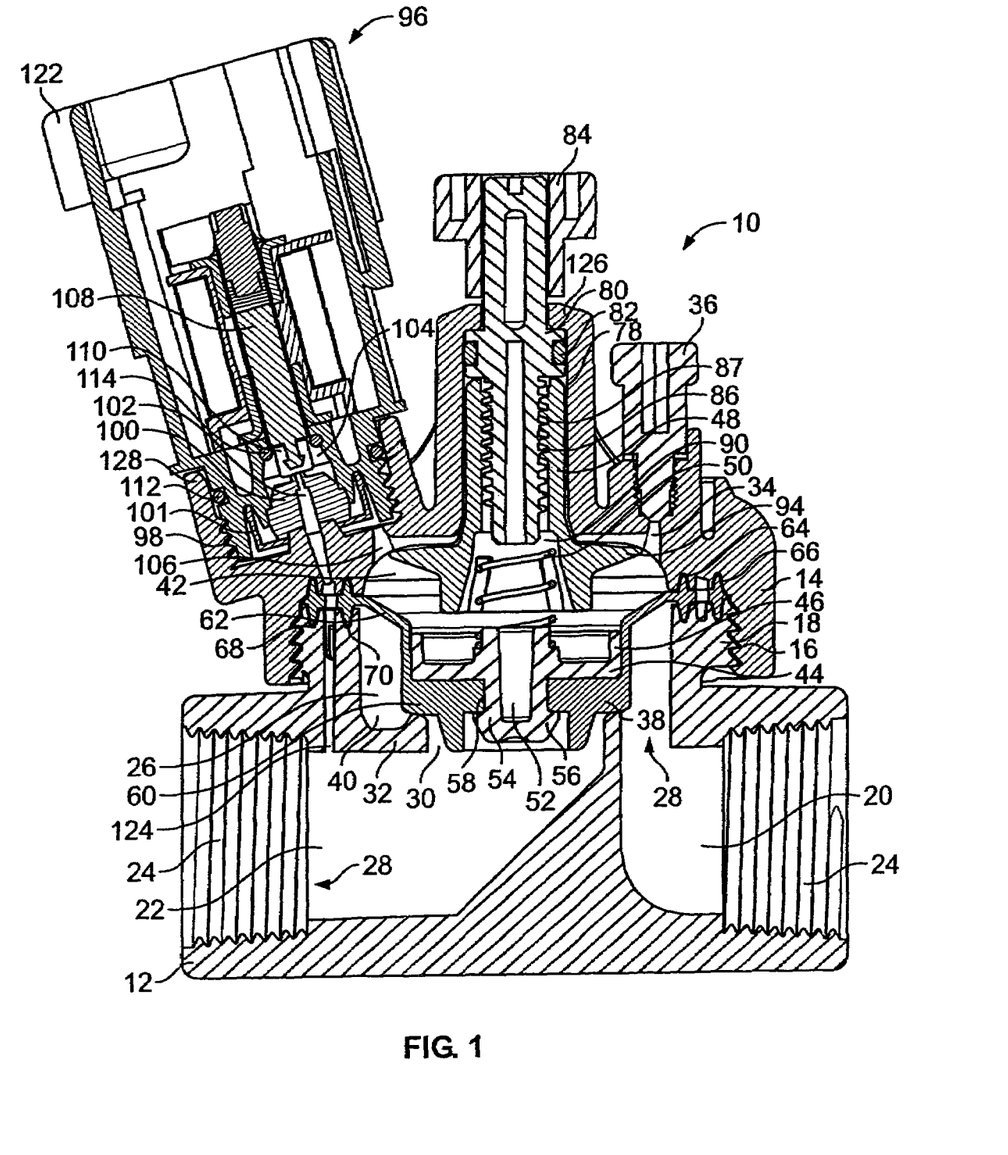
FIG. 1 is a cross-sectional view of a valve assembly including a control piston embodying features of the present invention.

With reference to FIG. 1, there is illustrated an improved valve assembly referred to generally by the reference numeral 10. The valve assembly comprises a main body 12 and a valve bonnet 14, preferably constructed of plastic. The valve bonnet 14 is coupled to the main body 12 using threads 16 and 18, enabling the valve bonnet 14 to be removed from the main body to facilitate cleaning and maintenance of the valve assembly 10. The main body 12 defines an inlet port 20 and an outlet port 22, each adapted for connection to a source of water using threads 24, as shown, or a friction connection. The main body 12 and the bonnet 14 together define an internal pressure chamber 26 and a fluid flow path 28 extending from the inlet port 20, into the pressure chamber 26, through a valve port 30 (when opened), defined by a surrounding annular valve seat 32, and to the outlet port 22.

The bonnet defines a bleed vent 34, which provides fluid communication between the pressure chamber 26 and atmosphere. A bleed screw 36 cooperates with the bleed vent 34 to selectively open the bleed vent 34 for bleeding fluid or air out of the valve assembly.

Figure 5:
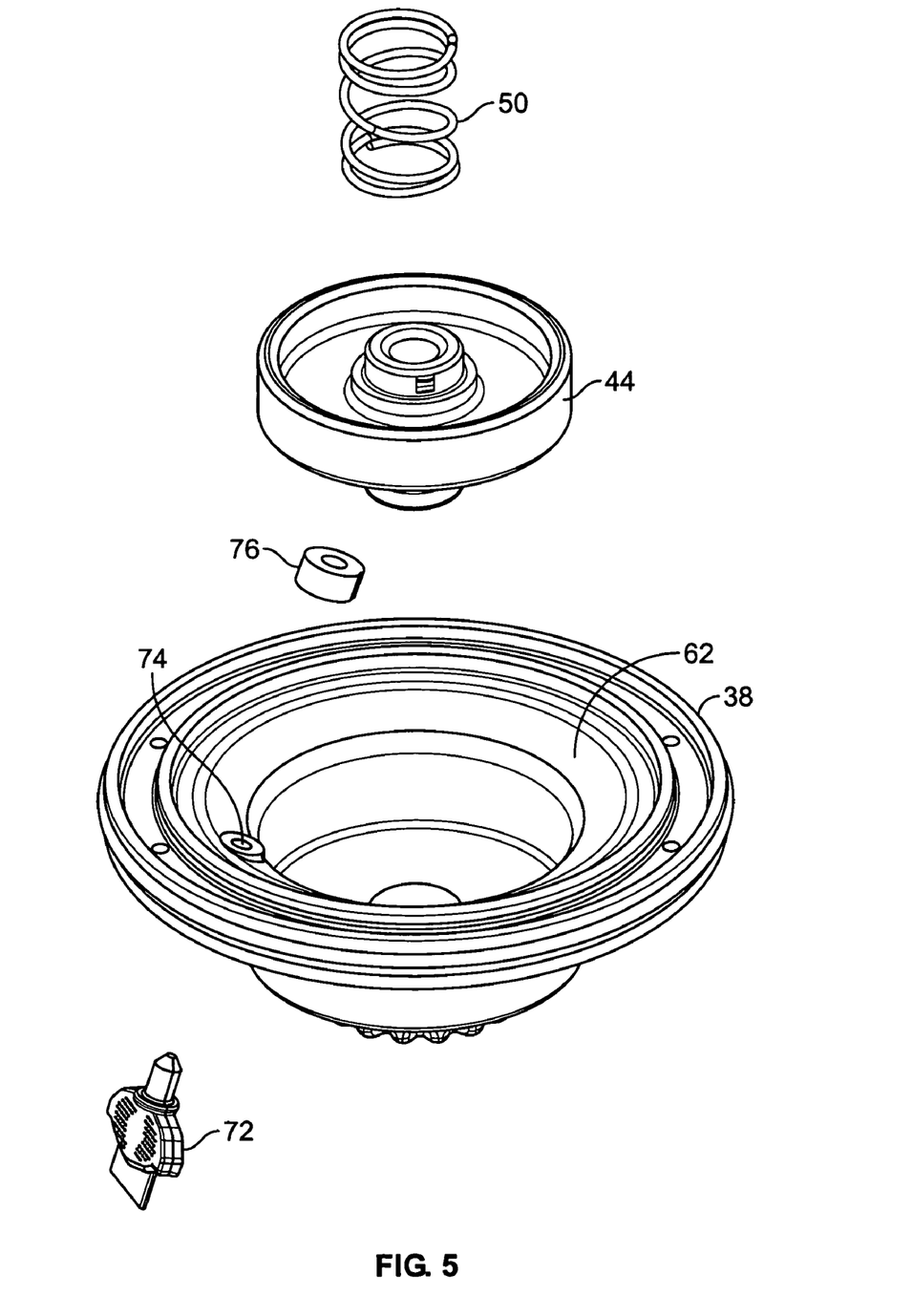
FIG. 5 is an exploded view of a diaphragm assembly of the valve assembly of FIG. 1.

With reference to FIGS. 1 and 5, a diaphragm 38, preferably constructed of a resilient material such as nitrile rubber, is mounted in the pressure chamber 26 and divides the pressure chamber 26 into an inlet chamber 40 and a control chamber 42. A rigid seat support 44 is press fit onto the diaphragm 38. The seat support 44 comprises an upper annular cup shaped portion 46, for contact with a control piston 48 and a spring 50, and defines a central bore 52 to facilitate manufacture.

The seat support 44 is coupled to the diaphragm 38 by means of a fastening structure such as a short shaft 54 with an enlarged end 56 that is forced through a central throughhole 58 defined by the diaphragm 38. The central portion 60 of the diaphragm 38 is sized and sufficiently rigid to be able to seal against the valve seat 32. The central portion 60 of the diaphragm 38 is surrounded by a relatively thin, flexible diaphragm webbing 62. The outer portion of the diaphragm 38 has a pair of concentric rings 64, 66 extending vertically above and below the diaphragm webbing 62. The concentric rings 64, 66 fit into matching concentric slots 68, 70 in the main body 12 and the bonnet 14, respectively, for mounting the diaphragm 38 in the valve assembly 10. A filter 72 is preferably mounted in an orifice 74 defined in the diaphragm webbing 62 and ultrasonically welded to a washer retainer 76. The orifice 74 provides metered fluid communication between the inlet chamber 40 and the control chamber 42.

Figure 2:
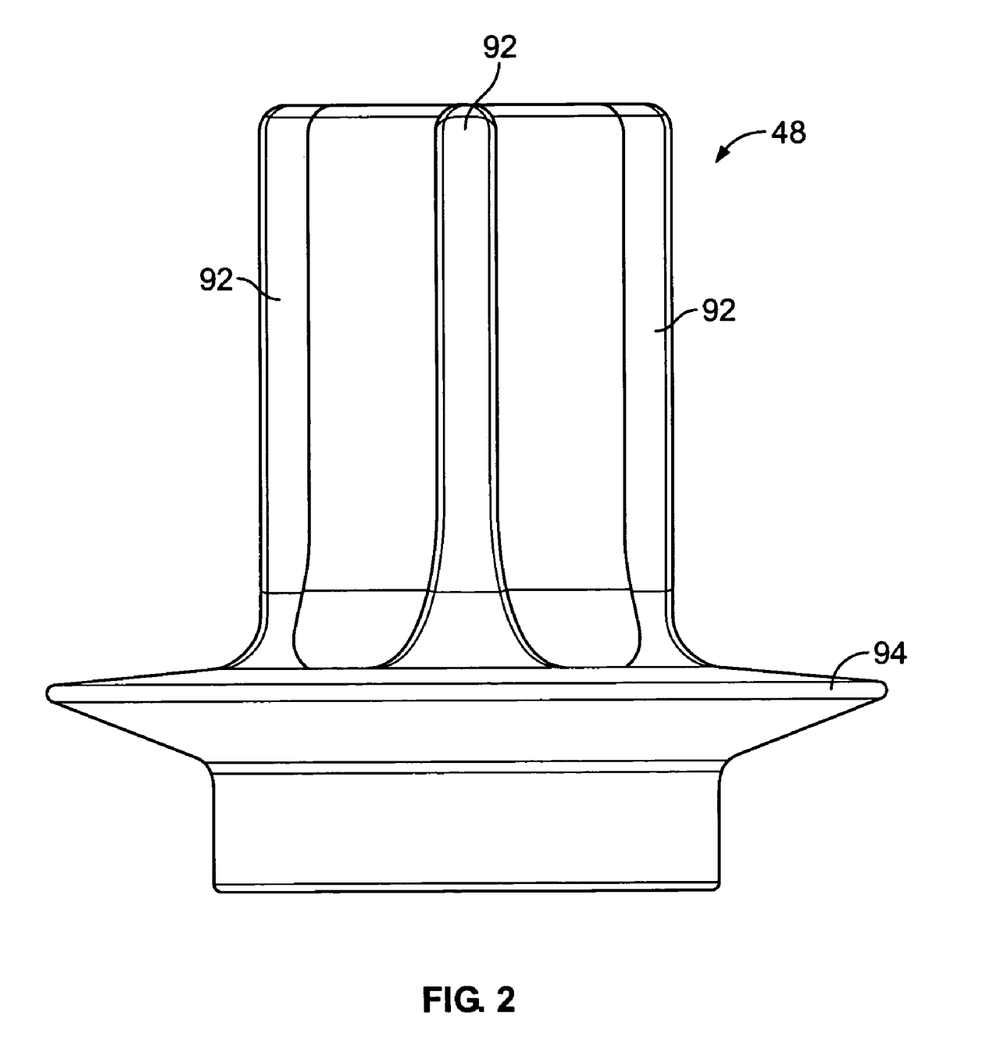
FIG. 2 is a perspective view of the control piston of the valve assembly of FIG. 1.
Figure 6:
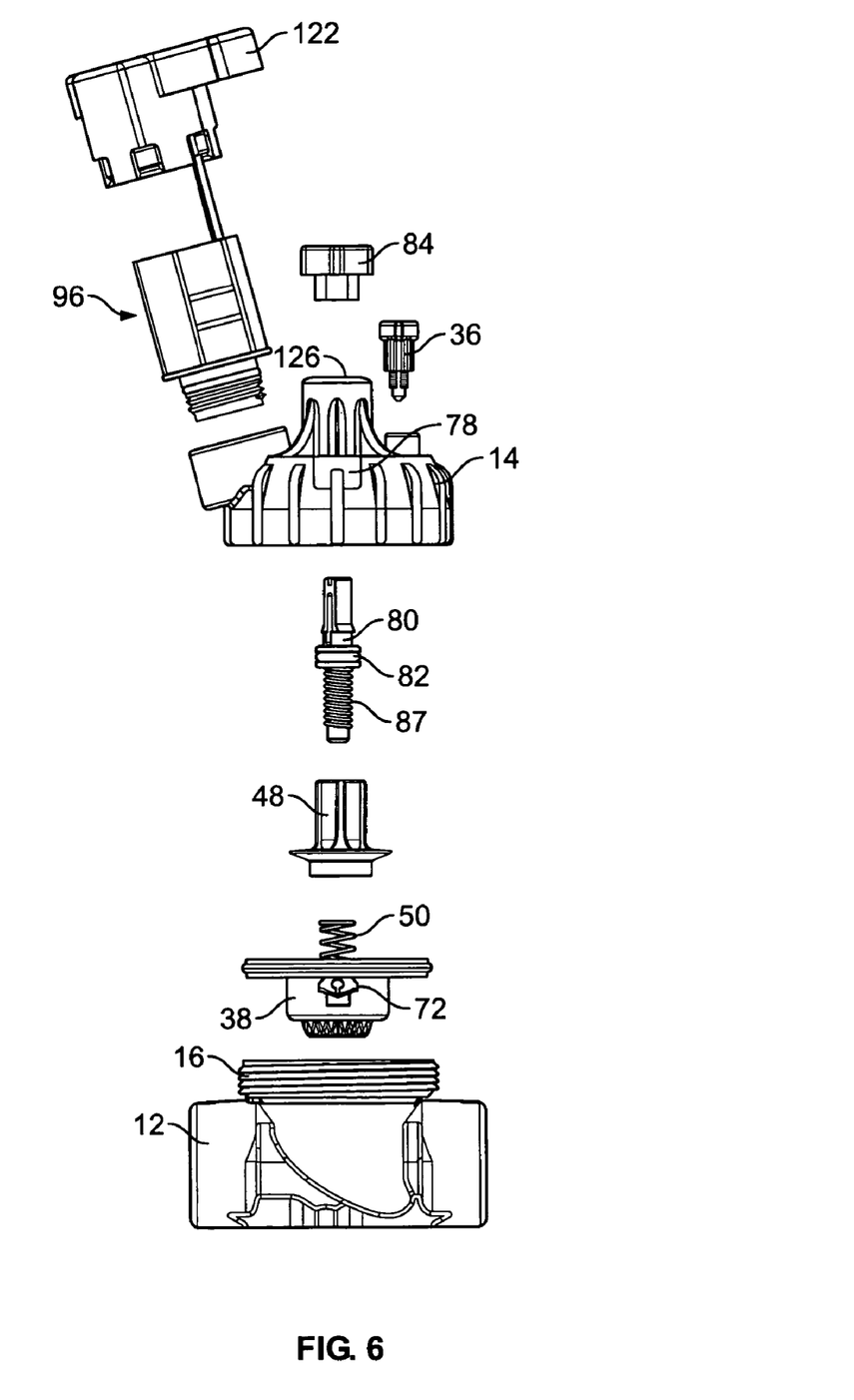
FIG. 6 is an exploded view of the valve assembly of FIG. 1.

The bonnet 14 defines an elongated throughbore 78 sized to receive a flow control shaft 80 and a control piston 48. The flow control shaft 80 extends through the throughbore 78 and out an opening 126 defined at the top of the bonnet 14. An o-ring 82 provides a seal around the flow control shaft 80. With reference to FIG. 6, a flow control knob 84, sized for turning by hand, is snapped onto to the outside end of the flow control shaft 80 and facilitates manual rotation of the flow control shaft 80. The flow control shaft 80 is free to rotate about its axis, but is restricted from moving axially. The inside end of the flow control shaft 80 and the top portion of the control piston 48 have mating threads 86 (FIG. 1), 87. The bottom portion of the control piston 48 defines a central bore 90 in which a spring 50 is received. The spring extends from the bore 90 in the control piston 48 to the seat support 44, and provides an adjustable force urging the diaphragm 38 toward a closed position. As seen in FIG. 2, the outer surface of the control piston 48 has elongated ridges 92 which mate with corresponding grooves (not shown) in the surface of the throughbore 78 of the bonnet 14, preventing the control piston 48 from rotating within the throughbore 78. The force of the spring 50 can be adjusted by rotation of the flow control knob 84, which controls the axial position of the control piston 48 which, in turn, determines the position of one end of the spring 50, thereby pre-loading the spring to provide a biasing force toward the closed position. In a preferred embodiment, the bottom portion of the control piston 48 comprises an enlarged portion 94 for providing support for a portion of the diaphragm 38 under certain conditions as described below. In a preferred configuration, the enlarged portion 94 has the form of a flared flange.

A solenoid actuated valve, generally denoted by the reference numeral 96, may be provided for remote electronic on/off flow control. The solenoid actuated valve 96 is mounted to the bonnet 14. More specifically, the bonnet defines a socket 128 with internal threads. The lower end of the solenoid actuated valve 96 has complementary threads 98 and is threadedly received in the socket 128. An o-ring 112 provides a seal above the threads 98. A solenoid retainer 100 defining a central bore 102 provides fluid communication between a solenoid valve chamber 104 and the outlet port 22 of the valve assembly 10. A feed port 106 provides fluid communication between the control chamber 42 and the solenoid actuated valve 96. A filter 101 removes particulates from the water before it flows into the solenoid valve chamber 104. The solenoid retainer 100 has passages (not shown) providing fluid communication between the feed port 106 and the solenoid valve chamber 104. The solenoid actuated valve 96 includes a plunger 108, whose position is controlled electrically, having a plunger tip 110, preferably made from rubber. The plunger tip 110 selectively seals the central bore 102 of the solenoid retainer 100 when the solenoid valve is deactivated. An o-ring 114 provides a seal around the plunger 108.

When the solenoid actuated valve 96 is in its open position, fluid can flow from the control chamber 42, through the solenoid actuated valve 96, through a drain passage 124 defined by the main body 12, and out through the outlet port 22. When the solenoid actuated valve 96 is in its closed position, flow through the feed port 106 is prohibited.

The valve assembly 10 may be placed in its closed position, prohibiting flow through the valve assembly 10, by deactivating the solenoid actuated valve 96, thereby closing off flow through the feed port 106. In this confuguration, a metered portion of the water flowing into the inlet chamber 40 will flow through the orifice 74 in the diaphragm 38 and into the control chamber 42 where it will accumulate because the feed port 106 is sealed off. The hydraulic pressure in the control chamber 42 will thus rise to match the hydraulic pressure in the inlet chamber 40. With the hydraulic forces on the diaphragm equalized, the force exerted by the spring 50 will cause the diaphragm 38 to seal against the valve seat 32.

The valve assembly 10 may be opened, allowing flow through the valve assembly 10, by activating the solenoid actuated valve 96, thereby allowing flow through the feed port 106. Water enters the valve assembly 10 via the inlet port 20 at the right and flows into the inlet chamber 40 which extends up and above the valve seat 32. A metered portion of the water entering the inlet chamber 40 will flow through the orifice 74 in the diaphragm 38 and into the control chamber 42. A portion of the water in the control chamber 42 flows through the feed port 106, through a filter 101, through passages (not shown) in the solenoid retainer 100 and out through the central bore 102 in the solenoid retainer 100 to the outlet port. Under equilibrium, the hydraulic pressure in the control chamber 42 will be substantially equal to that in the outlet port 22, while the hydraulic pressure in the inlet chamber 40 will be substantially equal to that in the inlet port 20. The difference between the two hydraulic pressures, representing the pressure drop across the valve assembly 10, causes the diaphragm 38 to rise off of the valve seat 32, thereby permitting flow through the valve 10.

Figure 7:
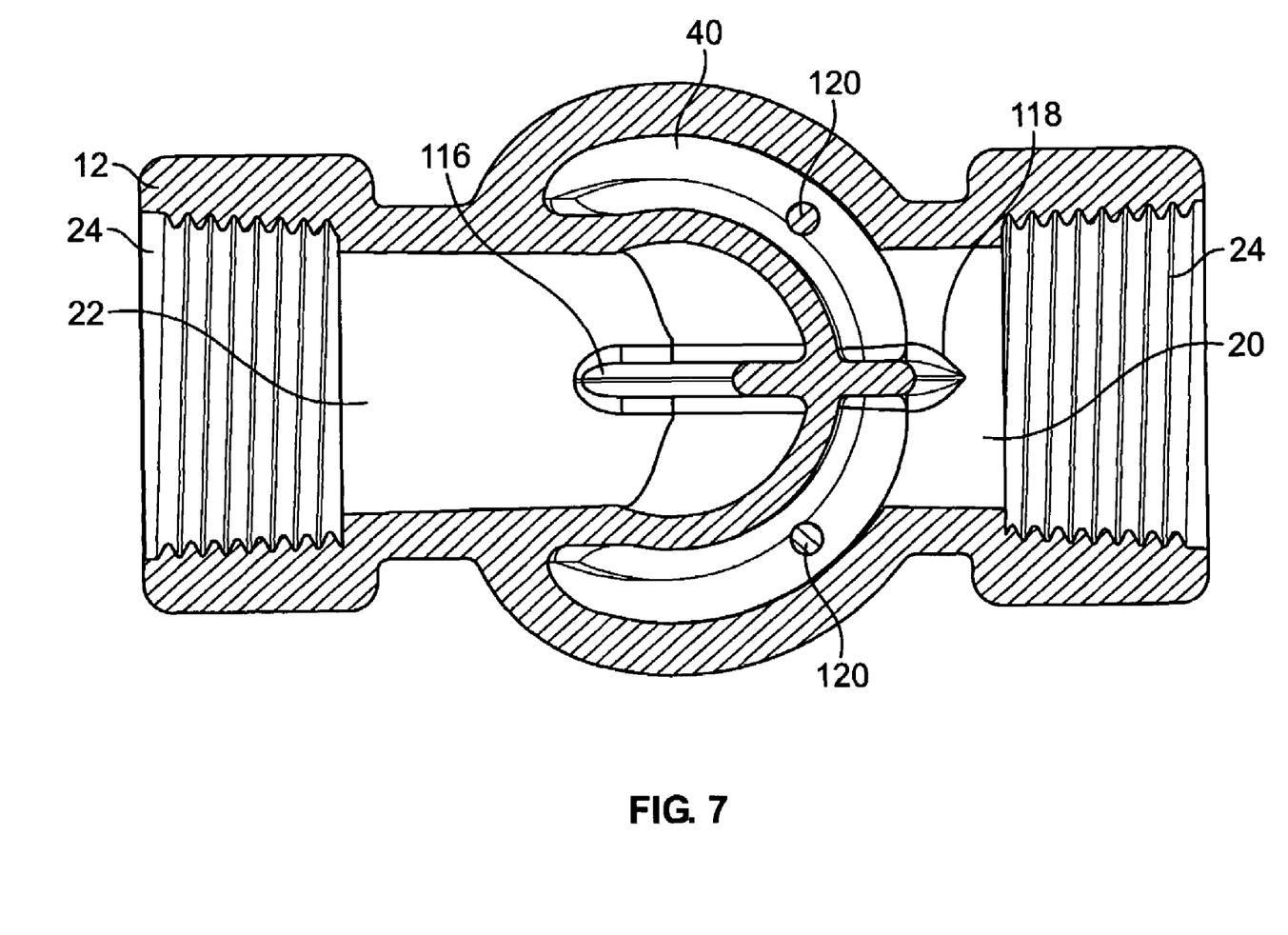
FIG. 7 is a horizontal cross-sectional view of a main body of the valve assembly of FIG. 1.

Referring to FIG. 7, a central rib 116 provides structural support for the main body 12. An inlet end 118 of the central rib 116 is tapered to help smooth flow from the inlet port 20 to the inlet chamber 40. The inlet chamber 40 extends above the valve seat 32.

Water flowing down through the valve seat 32 exits the valve assembly 10 through the outlet port 22. The molding process may leave two cavities 120 that have no meaningful effect on the flow of water.

Referring to FIG. 1, a handle 122 on the solenoid actuated valve 96 facilitates manual rotation of the solenoid actuated valve 96 to permit manually turning on the valve assembly 10. In its normal, fully attached position, the solenoid actuated valve 96 functions as described above, allowing remote electronic on/off control of the valve assembly 10. When the solenoid actuated valve 96 is manually rotated out of its fully attached position, the solenoid retainer 100 is withdrawn from engagement with the bonnet 14, thus allowing flow from the control chamber 42 through the drain passage 124 and out to the outlet port 22, thereby overriding the electronic on/off capability and placing the valve assembly 10 in an open condition.

Figure 3:
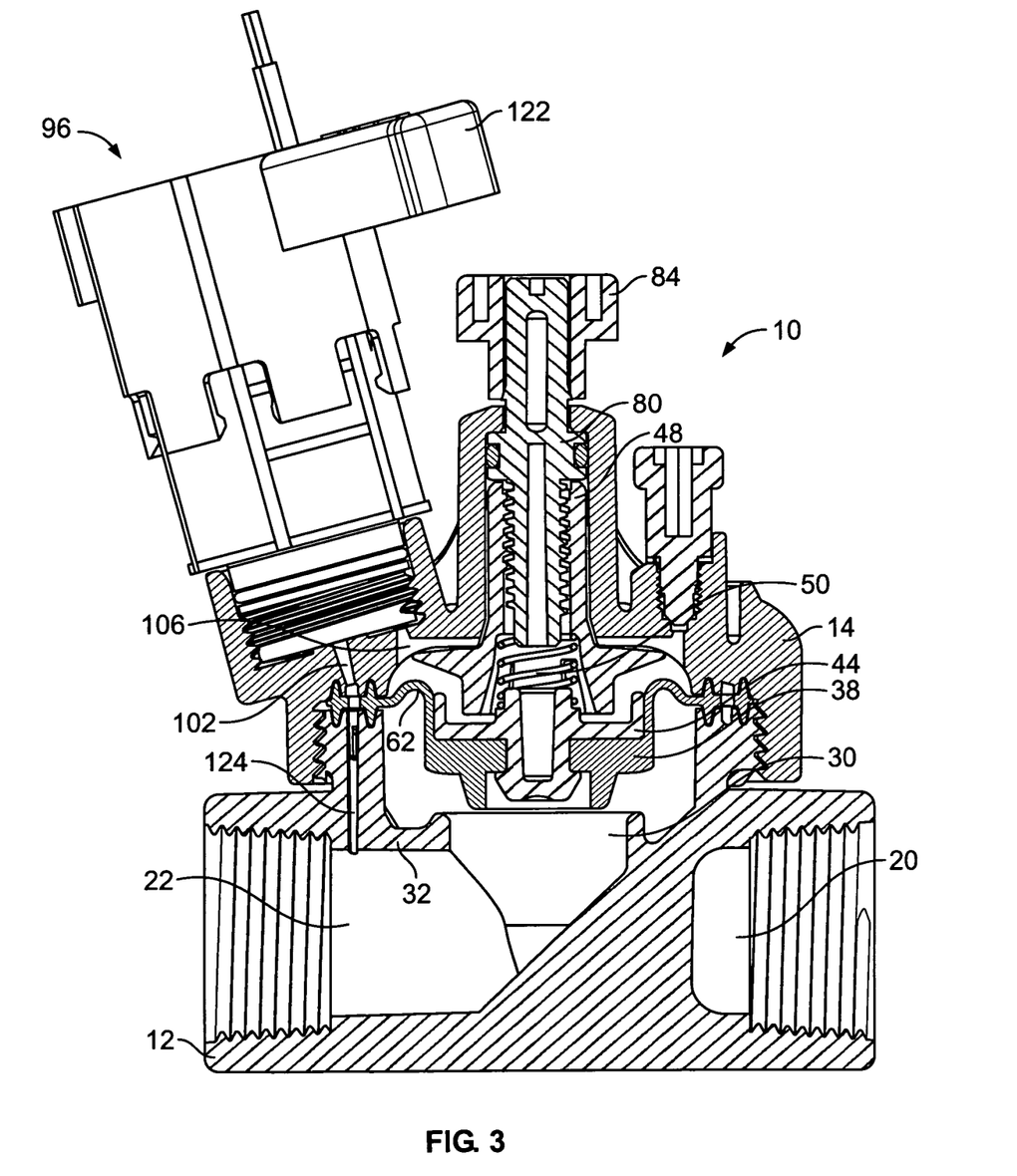
FIG. 3 is a cross-sectional view of the valve assembly of FIG. 1 in the full, flow on condition.
Figure 4:
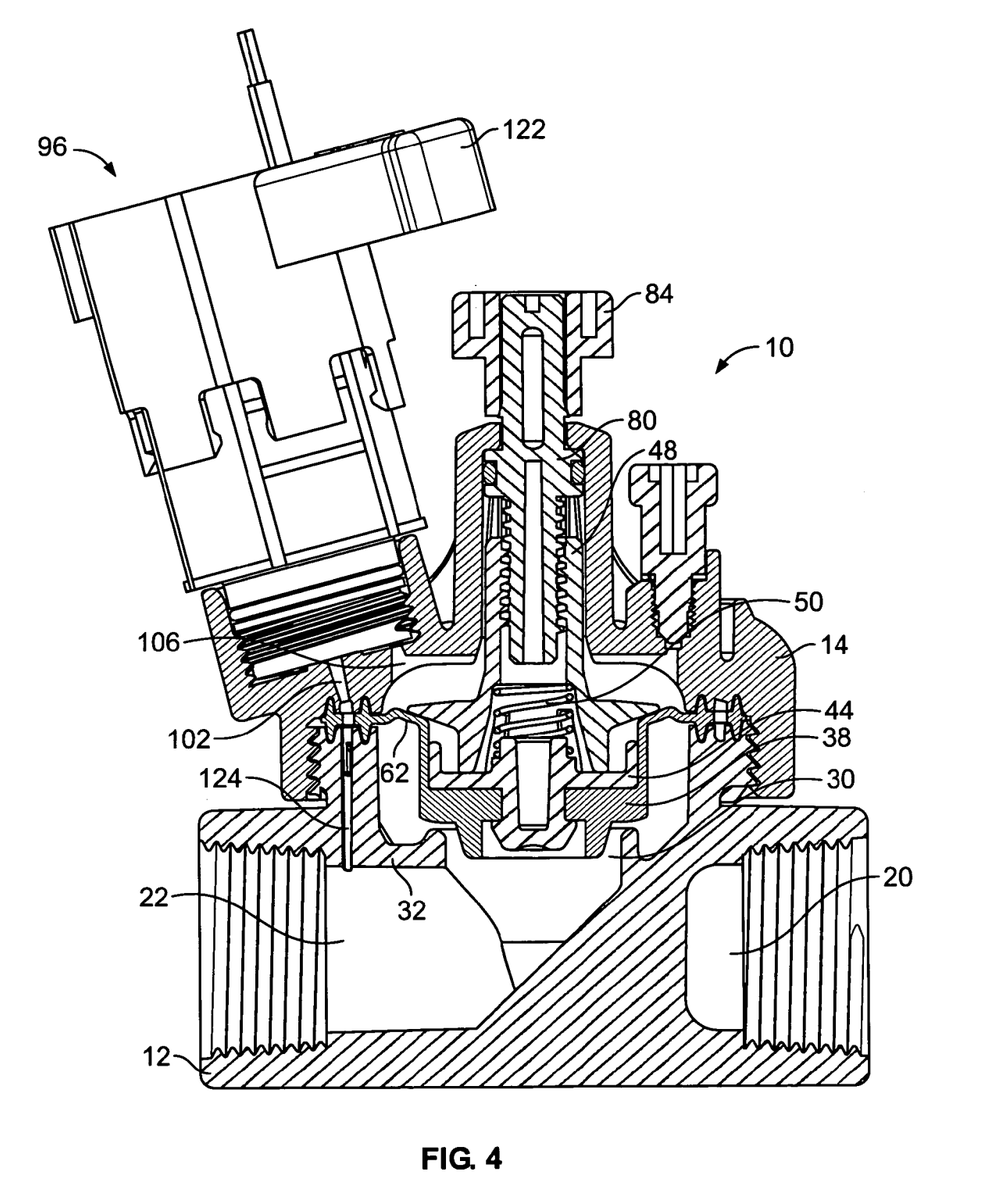
FIG. 4 is a cross-sectional view of the valve assembly of FIG. 1 in a restricted flow condition.

Flow through the valve assembly can be adjusted using the flow control knob 84 to move the control piston 48 and selectively pre-load the spring 50. As illustrated in FIG. 3, the valve assembly 10 is in its full flow on condition with the control piston 48 in its extreme upward position. In this condition, the diaphragm 38 is free to move off of the valve seat 32, substantially opening flow through the valve port 30. As the flow control knob 84 is turned clockwise, the control piston 48 is moved to a downward position as shown in FIG. 4. The downward position of the control piston 48 further pre-loads the spring 50 and limits the movement of the diaphragm off of the valve seat, thereby limiting flow through the valve assembly 10.

As flow through the valve assembly 10 is limited, the pressure drop across the valve assembly 10 increases. The pressure differential between the inlet chamber 40 and the control chamber 42 will increase to match the pressure drop across the valve assembly 10. As this pressure differential increases, greater stresses are placed on the resilient portion of the diaphragm 38. As the diaphragm 38 is being urged down toward the valve seat by force of the spring 50 and the control piston 48, the hydraulic pressure in the inlet chamber 40 is acting to push upward on the diaphragm webbing 62, causing it to flex upward and stretch. The resultant stresses can cause the diaphragm 38 to wear and even tear, both generally leading to a reduced lifetime for the diaphragm 38.

In order to prolong the life of the diaphragm 38, support is provided for the resilient diaphragm webbing 62. In a preferred embodiment, a flared flange 94, as seen in FIG. 2, is added to the control piston 48 to provide this support. The bottom surface of the flared flange 94 has a surface that slopes upward as it extends radially outward. The contour of the flange 94 roughly matches the contour of the diaphragm webbing 62. When the control piston 48 is lowered, the flared flange 94 acts to limit the space into which the diaphragm webbing 62 can flex. As the increased hydraulic pressure differential between the inlet chamber 40 and the control chamber 42 causes the diaphragm webbing 62 to flex upward, the diaphragm webbing 62 will encounter the flared flange 94 which will prevent further flexing.

Referring to FIG. 4, for example, the valve assembly 10 is illustrated in a controlled, low flow condition. The control piston 48 has been lowered and is forcing the diaphragm 38 nearly into contact with the valve seat 32. In this configuration, the pressure drop across the valve assembly 10, and, hence, the stress on the diaphragm webbing 62 is near the greatest possible. The flange 94 limits the amount of space into which the resilient portion of the diaphragm 38 can flex and provides structural support when the resilient portion of the diaphragm 38 flexes upward due to the pressure differential across the diaphragm 38.

The flange 94 should be located low enough on the shaft of the control Piston 48 to be able to limit the amount of flexing of the diaphragm webbing 62 when the control piston 48 is in a lowered position. The support provided by the flange 94 will extend the useful life of the diaphragm webbing 62 and will dramatically decrease the strain on the diaphragm webbing 62, thereby decreasing the likelihood that the diaphragm webbing 62 will tear suddenly. Computer models have demonstrated as much as a 40% decrease in strain on the diaphragm webbing 62. Those skilled in the art will recognize that support for the diaphragm 38 can be provided by a variety of shapes of an enlarged portion 94 of the control piston 48 and that the exact location of the enlarged portion 94 may be varied.

The foregoing relates to a preferred exemplary embodiment of the invention. It is understood that other embodiments and variants are possible which lie within the spirit and scope of the invention as set forth in the following claims.

The invention claimed is:

1. A valve assembly comprising:
    a housing defining a main fluid passage having an inlet and an outlet;
    a valve seat disposed along the main fluid passage within the housing between the inlet and outlet passages;
    a diaphragm having a main portion for engaging the valve seat, an outer portion for mounting the diaphragm on the housing, and a webbing portion intermediate the main portion and the outer portion, the webbing portion flexing as the diaphragm moves,
    wherein the diaphragm is disposed at least primarily upstream of the valve seat and movable between a closed position where the main portion engages the valve seat to close flow through the main fluid passage and an open position where the main portion is spaced from the valve seat to permit flow through the main passage; and
    a piston movable relative to the housing, the main portion of the diaphragm, and the webbing, and capable of selectively limiting the travel of the diaphragm, wherein the piston includes an enlarged portion for engaging, and providing support for, at least a part of the webbing portion to limit movement of the webbing portion.

2. The valve assembly of claim 1 wherein the enlarged portion comprises a flange that extends radially outward.

3. The valve assembly of claim 2, wherein the flange is a flared flange.

4. The valve assembly of claim 2, wherein the flange slopes upward as it extends radially outward.

5. The valve assembly of claim 1 wherein the piston is capable of being selectively moved into engagement with the diaphragm to move the diaphragm toward the closed position.

6. The valve assembly of claim 1 further comprising a substantially rigid seat support coupled to the main portion of the diaphragm and engaging the piston while the piston engages the webbing portion.

7. The valve assembly of claim 1, wherein the enlarged portion has an outer surface for engaging and supporting at least a portion of the webbing portion.

8. The valve assembly of claim 7, wherein the surface is flat to form a flat segment in the at least a portion of the webbing portion.

9. The valve assembly of claim 1 wherein the enlarged portion is configured so that engagement between the enlarged portion and the at least a portion of the webbing portion restricts the flexing of the at least a portion of the webbing portion.

10. A flow control valve comprising:
    a housing defining a main fluid passage with an inlet and an outlet and defining a control chamber disposed between the inlet and outlet;
    a valve seat disposed within the housing along the main fluid passage;
    a diaphragm disposed primarily upstream of the valve seat and separating the control chamber into a first chamber and a second chamber;
    the diaphragm being movable between a closed position engaged with the valve seat surface whereby flow through the valve is at least substantially prohibited and a range of open positions spaced apart from the valve seat permitting flow through the valve; and
    a piston movable with respect to the housing and the diaphragm, and extending into the control chamber and capable of urging the diaphragm toward the closed position, the piston having a flared flange for engaging and providing support for the diaphragm to limit movement of at least a portion of the diaphragm.

11. The flow control valve of claim 10 wherein the diaphragm defines an orifice providing fluid communication between said first and second chambers.

12. The flow control valve of claim 11 further comprising a substantially rigid seat support coupled to the diaphragm and a spring biasing the diaphragm toward the closed position.

13. The flow control valve of claim 12 wherein the bias of the spring is selectively adjustable by moving the piston.

14. The flow control valve of claim 13 further comprising a manually operable valve stem extending outside of the housing and mounted for movement relative to the housing for controlling the position of the piston.

15. A piston for use in a diaphragm valve having a flexible diaphragm, the flexible diaphragm having a main portion for engaging a valve seat, an outer portion for mounting the diaphragm on a valve housing, and a webbing portion intermediate the main portion and the outer portion, the webbing portion flexing as the diaphragm moves, the piston comprising:

a radially and outwardly extending portion configured to engage and support at least a portion of the webbing portion and limit the stretching of the webbing portion due to a pressure differential across the diaphragm, the piston being configured to engage at least a portion of the webbing portion depending on a selected piston position within the valve and the pressure differential across the diaphragm.

* * * * *

UNITED STATES PATENT AND TRADEMARK OFFICE
CERTIFICATE OF CORRECTION

PATENT NO. : 7,475,863 B2  Page 1 of 1
APPLICATION NO. : 11/251023
DATED : January 13, 2009
INVENTOR(S) : Donovan It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 383 days Delete the phrase "by 383 days" and insert -- by 474 days --

Signed and Sealed this

Eleventh Day of May, 2010

David J. Kappos
*Director of the United States Patent and Trademark Office*